United States Patent
Kolling et al.

(10) Patent No.: US 11,101,691 B2
(45) Date of Patent: Aug. 24, 2021

(54) METHOD FOR COORDINATING AN EXCHANGE OF POWER BETWEEN A PLURALITY OF TECHNICAL SMALL UNITS AND AN ELECTRICAL TRANSMISSION NETWORK

(71) Applicant: Bayerische Motoren Werke Aktiengesellschaft, Munich (DE)

(72) Inventors: Joachim Kolling, Eching (DE); Thomas Schmid, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 204 days.

(21) Appl. No.: 16/590,013

(22) Filed: Oct. 1, 2019

(65) Prior Publication Data

US 2020/0036225 A1 Jan. 30, 2020

Related U.S. Application Data

(63) Continuation of application No. PCT/EP2018/058889, filed on Apr. 6, 2018.

(30) Foreign Application Priority Data

Apr. 7, 2017 (DE) ...................... 10 2017 205 968.0

(51) Int. Cl.
*G06Q 50/06* (2012.01)
*H02J 13/00* (2006.01)
(Continued)

(52) U.S. Cl.
CPC .......... *H02J 13/0079* (2013.01); *G05B 15/02* (2013.01); *G06Q 50/06* (2013.01);
(Continued)

(58) Field of Classification Search
None
See application file for complete search history.

(56) References Cited

U.S. PATENT DOCUMENTS 6,434,620 B1 * 8/2002 Boucher ................. H04L 29/06
709/230
8,588,991 B1 * 11/2013 Forbes, Jr. ............. H04L 67/10
700/295
(Continued)

FOREIGN PATENT DOCUMENTS

EP 2 337 178 A2 6/2011
JP 2011-92002 A 5/2011

OTHER PUBLICATIONS

Zhang et al., "Energy Management Framework for Electric Vehicles in the Smart Grid: A Three-Party Game", Dec. 2016, Integrated Communications, Control, and Computing Technologies for Enabling Autonomous Smart Grid, IEEE Communications Magazine. (Year: 2016).*

(Continued)

*Primary Examiner* — Mohammad Ali
*Assistant Examiner* — Kelvin Booker
(74) *Attorney, Agent, or Firm* — Crowell & Moring LLP (57) ABSTRACT

A method coordinates an exchange of power between a plurality of technical small units on the one hand and a transmission network on the other hand. A central control device forms a general schedule from individual schedules of all available small units and controls the exchange of power of the small units with the transmission network according to the general schedule, wherein a delta schedule is calculated by the control device from a balancing of the general schedule and a predetermined call-off plan of a network operator or an electricity exchange. A central memory connected to the transmission network is controlled according to the delta schedule, such that the central (Continued)

memory exchanges an electrical compensation power with the transmission network, such that the technical small units and the central memory together carry out the call-off plan.

16 Claims, 3 Drawing Sheets

(51) Int. Cl.
*G05B 15/02* (2006.01)
*H02J 3/14* (2006.01)
*H02J 3/32* (2006.01)
*H02J 3/00* (2006.01)
*H02J 3/38* (2006.01)

(52) U.S. Cl.
CPC ............ *H02J 3/008* (2013.01); *H02J 3/14* (2013.01); *H02J 3/32* (2013.01); *H02J 3/383* (2013.01)

(56) References Cited

U.S. PATENT DOCUMENTS

| | | | |
|---|---|---|---|
| 2005/0187727 A1* | 8/2005 | Weik | H02J 3/14 700/291 |
| 2005/0192713 A1* | 9/2005 | Weik | G06Q 50/188 700/295 |
| 2008/0040295 A1* | 2/2008 | Kaplan | H02J 3/38 705/412 |
| 2008/0040296 A1* | 2/2008 | Bridges | G06Q 50/06 705/412 |
| 2008/0052145 A1* | 2/2008 | Kaplan | H02J 3/322 705/7.12 |
| 2009/0281673 A1* | 11/2009 | Taft | H02J 3/0073 700/286 |
| 2010/0217550 A1* | 8/2010 | Crabtree | H02J 13/0079 702/62 |
| 2010/0217651 A1* | 8/2010 | Crabtree | G06Q 10/00 705/7.22 |
| 2010/0250590 A1* | 9/2010 | Galvin | G06F 1/3203 707/770 |
| 2011/0022434 A1* | 1/2011 | Sun | G06Q 50/06 705/7.37 |
| 2011/0029141 A1* | 2/2011 | Sun | H02J 3/00 700/291 |
| 2011/0029147 A1* | 2/2011 | Sun | G05B 15/02 700/295 |
| 2011/0035071 A1* | 2/2011 | Sun | H02J 3/00 700/291 |
| 2011/0055287 A1* | 3/2011 | Sun | G06Q 10/04 707/805 |
| 2011/0071690 A1* | 3/2011 | Sun | G06Q 50/06 700/286 |
| 2011/0071693 A1* | 3/2011 | Sun | G06F 16/25 700/291 |
| 2012/0041804 A1* | 2/2012 | Sahinoglu | H04W 4/02 705/14.1 |
| 2012/0109392 A1* | 5/2012 | Hanks | H02J 3/382 700/291 |
| 2012/0223578 A1 | 9/2012 | Bartelt-Muszynski | |
| 2013/0345884 A1 | 12/2013 | Forbes, Jr. | |
| 2013/0345888 A1* | 12/2013 | Forbes, Jr. | H04L 67/10 700/291 |
| 2013/0346768 A1* | 12/2013 | Forbes, Jr. | G05F 1/66 713/310 |
| 2014/0012427 A1* | 1/2014 | Katayama | H02J 13/00034 700/291 |
| 2014/0018969 A1* | 1/2014 | Forbes, Jr. | H02J 3/32 700/295 |
| 2014/0188297 A1* | 7/2014 | Jordan | G06Q 10/08 700/295 |
| 2015/0094968 A1* | 4/2015 | Jia | G01R 21/133 702/60 |
| 2015/0364919 A1 | 12/2015 | Schumer et al. | |
| 2015/0378381 A1* | 12/2015 | Tinnakornsrisuphap | F24F 11/30 700/276 |
| 2016/0010879 A1 | 1/2016 | Rognli et al. | |
| 2016/0172854 A1* | 6/2016 | Zhou | H02J 3/466 700/291 |
| 2016/0190806 A1 | 6/2016 | Taimela et al. | |
| 2016/0357165 A1 | 12/2016 | Stiefenhofer | |
| 2017/0104337 A1* | 4/2017 | Drees | H02S 40/32 |
| 2017/0104449 A1* | 4/2017 | Drees | H02S 50/00 |
| 2019/0279313 A1* | 9/2019 | Miyamoto | G01R 21/1333 |

OTHER PUBLICATIONS

Wu et al., "Hierarchical control framework for integrated coordination between distributed energy resources and demand response", Jan. 2017, Electric Power Systems Research 150 (2017) 45-54. (Year: 2017).*

Mondal et al., "Game-Theoretic Distributed Virtual Energy Cloud Topology Control for Mobile Smart Grid", 2014 IEEE 6th International Conference on Cloud Computing Technology and Science. (Year: 2014).*

Ferryman et al., "Net Interchange Schedule Forecasting of Electric Power Exchange for RTO/ISOs", Jul. 2012, 2012 IEEE Power and Energy Society General Meeting. (Year: 2012).*

International Search Report (PCT/ISA/210) issued in PCT Application No. PCT/EP2018/058889 dated Jul. 11, 2018 with English translation (five (5) pages).

German-language Written Opinion (PCT/ISA/237) issued in PCT Application No. PCT/EP2018/058889 dated Jul. 11, 2018 (five (5) pages).

German-language Search Report issued in counterpart German Application No. 10 2017 205 968.0 dated Apr. 3, 2018 with partial English translation (10 pages).

* cited by examiner

METHOD FOR COORDINATING AN EXCHANGE OF POWER BETWEEN A PLURALITY OF TECHNICAL SMALL UNITS AND AN ELECTRICAL TRANSMISSION NETWORK

CROSS REFERENCE TO RELATED APPLICATIONS

This application is a continuation of PCT International Application No. PCT/EP2018/058889, filed Apr. 6, 2018, which claims priority under 35 U.S.C. § 119 from German Patent Application No. 10 2017 205 968.0, filed Apr. 7, 2017, the entire disclosures of which are herein expressly incorporated by reference.

BACKGROUND AND SUMMARY OF THE INVENTION

The invention relates to a method for coordinating an exchange of power between a plurality of technical small units on the one hand, and a public, electrical transmission grid or supply network or electricity grid, on the other hand. The small units are connected to the transmission grid for this purpose. The exchange of power is controlled by a central control device. The invention also covers the central control device and a system which comprises the control device and switching units for selecting the technical small units.

A technical unit in the context of the invention represents a technical system, which generates, consumes and/or temporarily stores electrical energy and is connected via a respective connection to the grid for this purpose. A small unit in this context is a technical unit, whose electrical power exchangeable with the transmission grid is less than 1 MW. Examples are a domestic photovoltaic system, a heat pump of a building, a stationary battery storage unit, and an electric vehicle.

A method of the above-described type is known, for example, from US patent publication US 2013/0345884 A1. The control device known from the prior art for carrying out the method tries to supply a minimum total power in the transmission system by connecting the small units. If the small units are, for example, photovoltaic systems, however, then it must be assumed that not every photovoltaic system can deliver the planned electrical power at a given switching time. Therefore, in the control device from the prior art it is necessary to hold excess capacity in reserve in order to be able to guarantee the minimum power. This makes the operation inefficient.

In the context of the operation of photovoltaic systems in private households, it is known from the prior art that it is possible to avoid providing a stationary battery store for these systems by selecting the photovoltaic systems to feed directly into a transmission grid, and the resulting energy contribution being held and temporarily stored in a common central store as usable power for the photovoltaic systems.

The object of the invention is to efficiently control technical small units on a transmission grid using a central control device.

The invention provides a method for coordinating an exchange of power between a plurality of technical small units on the one hand, and a transmission grid, on the other hand. The small units are connected to the transmission grid for this purpose. A small unit in the context of the invention is understood to mean a technical system, which for the respective power exchange can only supply a so-called pre-qualified power or nominal power, which is less than 1 MW. In particular, a technical small unit is understood to mean a technical system which cannot independently be present or trade on an electricity exchange or an energy market. Using the method, therefore, the technical small units are coordinated in such a way that overall they form an infrastructure, with which commitments can be undertaken for a call-off plan of a network operator of the transmission grid or the electricity exchange on an electricity exchange or on an energy market. Such a call-off plan describes a schedule or a timetable of an electrical power, which a single technical unit, such as a power plant, must normally supply to the transmission grid in accordance with a contractual agreement. Such a call-off plan is binding and can be traded on an electricity exchange or an energy market. An example of such an electricity exchange is the EEX (European Energy Exchange).

In order to be able to implement a call-off plan using the plurality of small units, the central control device operates an energy data cloud, in which the control device aggregates or collects performance data of the small units. The energy data cloud can comprise, for example, a database. On the basis of the power data in the energy data cloud, the control device carries out the following steps for each small unit. An individual schedule is recorded for an available electrical power on the small unit. The individual schedule describes a power profile or a time schedule of the available power. In the context of the invention, power is to be understood to mean both the consumption and the temporary storage of electrical power. By this step of the method, it is also determined what electrical power can be connected to the respective small unit. An individual schedule of a photovoltaic system will always show, for example, that no power is available at night (in the dark).

At least one time interval is determined, within which an exchange of power on the small unit is allowed to be initiated by the central control device in accordance with predetermined access data. Such time slices will therefore be determined, in which the control device is allowed to access the small unit at all. If such a small unit is a photovoltaic system, for example, then the owner or operator of the small unit can block access, for example for certain hours of the day, to be able to use the power supplied by the photovoltaic system themselves. The access data can be specified by contract data, for example. If the control device is allowed to perform a power exchange, this can be regulated by an IT-based system (IT—information technology), in other words on the basis of a regulation scheme in order to extract a target power. The method step thus determines the proportion of the electrical power of a small unit that may be selected. It is important to note that the power exchange can relate both to the feeding of power into the transmission grid (that is, the provision or sale) and the supply out of the transmission system (in other words, the demand or purchase).

For each small unit, on the basis of the predetermined call-off plan of the network operator of the transmission network or the electricity exchange, a reference value is then determined for the power that can be deployed or selected in the respective time interval in accordance with the power profile. The call-off plan can specify, for example, a price of the power in the time interval and/or a demand. The reference value is obtained as a monetary value, or as benefits. Benefits in this case means that in the event that the call-off plan indicates power generation as a requirement but a small unit only allows power consumption, this leads to no benefit and hence the small unit is of no interest or is unusable for the time interval. By this method step, therefore, it is determined what the control device actually wants to select. This is decided by the control device so that it selects a small unit for a power exchange with the transmission grid in the respective time interval, if the reference value satisfies a predetermined optimization criterion. The reference value thus indicates whether a power exchange with the small unit in the time interval is worthwhile based on the optimization criterion.

Once the control device has checked all small units in this way, it is then known which small units should be selected or used for which time units. The division into time intervals can be carried out in a predetermined time grid. For example, each time interval can last 15 minutes. The central control device then forms an overall schedule for each time interval from the individual schedules of all small units selected for the respective time interval. In other words the control device merges the available electrical power of all selected small units. The central control device then selects the power exchange of the small units with the transmission grid in accordance with the overall schedule. The use of the optimization criterion ensures that only such small units as can provide an overall benefit for the plurality of the small units are involved or selected.

Now in the manner described earlier, it can happen that the actual power of a small unit deviates from the original individual schedule of the small unit. For example, due to cloudy conditions the power capacity of a photovoltaic system may be degraded.

In order nevertheless to be able to comply with the binding call-off plan of the network operator or electricity exchange, the following is provided. by means of the control device, from a balancing of the overall schedule and the specified call-off plan, a delta schedule is calculated. Again, this can be carried out by the control device by means of an IT infrastructure. The delta schedule indicates the difference or discrepancy or deviation of the overall schedule with respect to the call-off plan. A central store of electrical energy connected to the transmission grid is then controlled in accordance with the delta schedule, so that the central store exchanges an electrical compensation power with the transmission grid, so that the technical small units and the central store together implement the call-off plan.

There is therefore no need to select or reserve overcapacity of small units in order still to provide sufficient electrical power to fulfil the call-off plan if a small unit were to fail. Instead, only the efficient (as defined by the optimization criterion) small units are used and the central store is used to provide the compensation power, in order thus to be able to compensate for the power difference between the overall schedule of the small units and the required call-off plan. This does not require the inefficient operation of an overcapacity of small units. Instead, the central store is used. This can be charged up prior to the call-off plan, for example, with electrical energy from the small units under more favorable conditions, in photovoltaic systems, for example, in sunlight. This means that the small units do not need to be able to fulfill their individual schedule exactly at the time of the call-off plan or during the period of the call-off plan. Instead, a buffering is possible via the central store.

Thus, the small units can be operated efficiently or economically on the transmission grid and overall can represent a pre-qualified infrastructure for a call-off plan of a network operator or an electricity exchange. In other words, by means of the plurality of the small units and the central store together, a predetermined call-off plan of the network operator or electricity exchange can be met.

The invention also comprises extensions, which result in additional advantages.

The optimization criterion can provide a threshold value comparison of the reference value with a predetermined threshold. In other words, all the small units are selected whose reference value is larger or smaller than a predetermined threshold. Preferably, however, it is provided that an overall value optimization is performed of the total power exchanged between the central store and the small units, on the one hand, and the transmission grid, on the other hand, in other words it is maximized. This can be carried out using an asset management method. If the call-off plan prescribes, for example, a predefined overall power, e.g. 2 MW for one hour, then the control device can select all those small units that can jointly deliver the overall power, wherein the total sum of their reference values is additionally maximized in accordance with the optimization criterion. The overall power does not need to be provided exclusively by means of the small units: if there is cheaper energy stored in the central store, then compensation power can be fed in on the basis of this, instead of using a more expensive energy from small units.

The central store does not have to be available or operated exclusively to provide the compensation power, however. By means of the central store, a further power exchange may also be provided between the central store and the transmission grid to deliver control power. To this end, the control device can additionally control the central store so that the latter supplies electrical control power with the transmission grid in accordance with predetermined contract data, so that an additional power flow is obtained as control power. The contract data in this case specify a minimum control power to be deployed from the central store and the price for the control power. This extension provides the advantage that the central store can additionally be economically used.

In order also to integrate the small units, i.e. to also involve the small units in providing control power, one extension provides that at least part of the total control energy exchanged by the control power as a whole is implemented by means of the small units in a time-delayed manner. Implementing here means the following: in the case of a control power output (power generation), prior to deploying the control power the said part of the total control energy is aggregated or stored in the central store by means of the small units. The central store is thus filled up or charged by means of the small units, so that the central store can subsequently provide the control power. In the case of a control power uptake (power consumption), on the other hand, after deploying the control power the said part of the total control energy is consumed in the small units. If the central store must therefore be charged up to provide control power in order to reduce overcapacity in the transmission grid, then the energy absorbed or stored is consumed in the small units afterwards. It is thus possible that even small units can be used to provide control power in a transmission grid. The individual small units alone, of course, would otherwise not be pre-qualified to do so.

Each small unit therefore has a respective share of the total control energy. This energy contribution (production or consumption) is determined and on the basis of the contract data, a revenue value of the share is calculated and credited to the small unit. The contract data specify the terms on which the central store provides the control power in the transmission grid, i.e. in particular at what price. If the total control energy is then at least partly provided or absorbed (energy consumption) by the small units, this is paid to them in accordance with the contract data.

The energy contributions of small units for the control power are preferably only drawn from the small units if it is inexpensive according to the contract data to provide the control power. Alternatively, if it is cheaper, the energy can also be obtained by the central store from another source or be consumed therein. To accumulate energy before the deployment of the control power, the central store draws electrical power via the transmission grid from a different source than the small units, if a price signal indicates that the source is cheaper than the small units. Thus no energy is drawn from a small unit if the electrical energy of the small unit is more expensive than the energy from the source. Since the central store still needs to be charged, the energy is drawn from the source. Exactly, energy absorbed or stored during the provision of control power can be sold to a consumer other than the small units.

In order to also involve the small units or users in general on an economic basis, it can be provided that at least a part of the central store is divided into virtual partitions, each of which represents a portion of the storage capacity of the central store. The partitions are regions within the central store, wherein for each partition it can be specified or determined, whether and to what extent it is currently charged with electrical energy or discharged. In general, for each partition, a separate charge status of electrical energy can be defined. This is carried out in accordance with a predetermined distribution rule. Thus, if the central store exchanges electrical energy with the transmission grid (charging or discharging), by using the distribution rule it can be determined which partition this relates to. For example, a user to whom a partition is assigned can enable or specify that its partition should be used for the energy exchange. The charge status of the partition then changes during the energy exchange. In the event of a change in the charge status, an equivalent value of the resulting electrical energy exchanged with the transmission grid is booked to a billing account associated with the respective partition. The user who has specified that its partition is to be used for the energy exchange thus receives the equivalent value credited to this billing account, for example, a monetary equivalent value. Thus a user can also participate by means of a partition in the central store. In the same way, an operator of a small unit, even if its small unit is not used to fulfill a call-off plan, can nevertheless benefit from the call-off plan by enabling its partition in the central store for the provision of compensation power. In the same way, the user can charge a partition using its small unit (via the transmission grid), so that during the fulfillment of the call-off plan it is then able to supply not only the power from its small unit but also the energy previously stored in the partition.

Overall, therefore, a system is formed in which a central control device using a central store and a plurality of small units functions on the transmission network overall like a technical large unit, i.e. a technical unit which applies or achieves a pre-qualification for deploying control power to the transmission grid. In this case it is provided, in particular, that each small unit itself does not have or even lacks this pre-qualification. The power required by the call-off plan is thus larger than any individual power level that can be supplied by a respective small unit. In the transmission grid, the provision of power in accordance with the call-off plan can thus only be approved for technical units that have a pre-qualification greater than a predetermined power value, for example 1 MW. Each technical small unit does not need to be able to supply this power, but can have a nominal power less than the power value. Each small unit can be a technical unit with a nominal power of less 1 MW, in particular less than 100 kW. A small unit may be, for example, a photovoltaic system, a pumped-storage power plant, a heat pump for power generation, an electrically operable motor vehicle with an external charging interface or a stationary battery accumulator. The plurality of small units can comprise different instances of the above systems.

Since the individual schedules of the small units are available or can be determined in the energy data cloud, the control device can also be used to forecast a future electrical behavior of the small units centrally on the basis of the individual schedules. Thus, for example, for a certain time of day of a certain weekday, the forecast can be determined from historical individual schedules.

The central store can store the electrical energy using electrochemical accumulators (i.e. batteries) and/or by using a pumped-storage power plant, these being only some examples of storage technologies. In particular, the central store has a pre-qualification of at least 1 MW. In other words, the central store is qualified for the provision of control power in the transmission grid.

To carry out the method, the invention provides the described control device, which is configured to control a central store and a plurality of switching units for respectively selecting a technical small unit, in particular in accordance with one embodiment of the method according to the invention. The control device can be provided, for example, as a server on the internet. It can comprise a computer or a computer network or an IT platform. In other words, the method can be implemented on the basis of at least one microprocessor. The invention also comprises the system described above. The system comprises the control device, the central store and a plurality of switching units for respectively selecting a technical small unit. The switching unit can be designed, for example, as a control computer for the small unit. Each switching unit can be configured to be installed on one small unit each, in order to control its power exchange with the transmission grid. The switching units can communicate with the central control device via a respective communication link. For this purpose, the communication link can be based, for example, on an internet connection. To collect the power data described, which are aggregated in the energy data cloud, a metering point can be installed on each small unit, for example a so-called smart meter.

Additional features of the invention arise from the claims, the figures and the description of the figures. The features and feature combinations cited in the description above, and the features and feature combinations cited in the description of the figures below and/or shown in the figures alone are applicable not only in the respective combination indicated but also in other combinations or in isolation.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, functionally equivalent elements are provided with the same reference numerals.

DETAILED DESCRIPTION OF THE DRAWINGS

Figure 1:
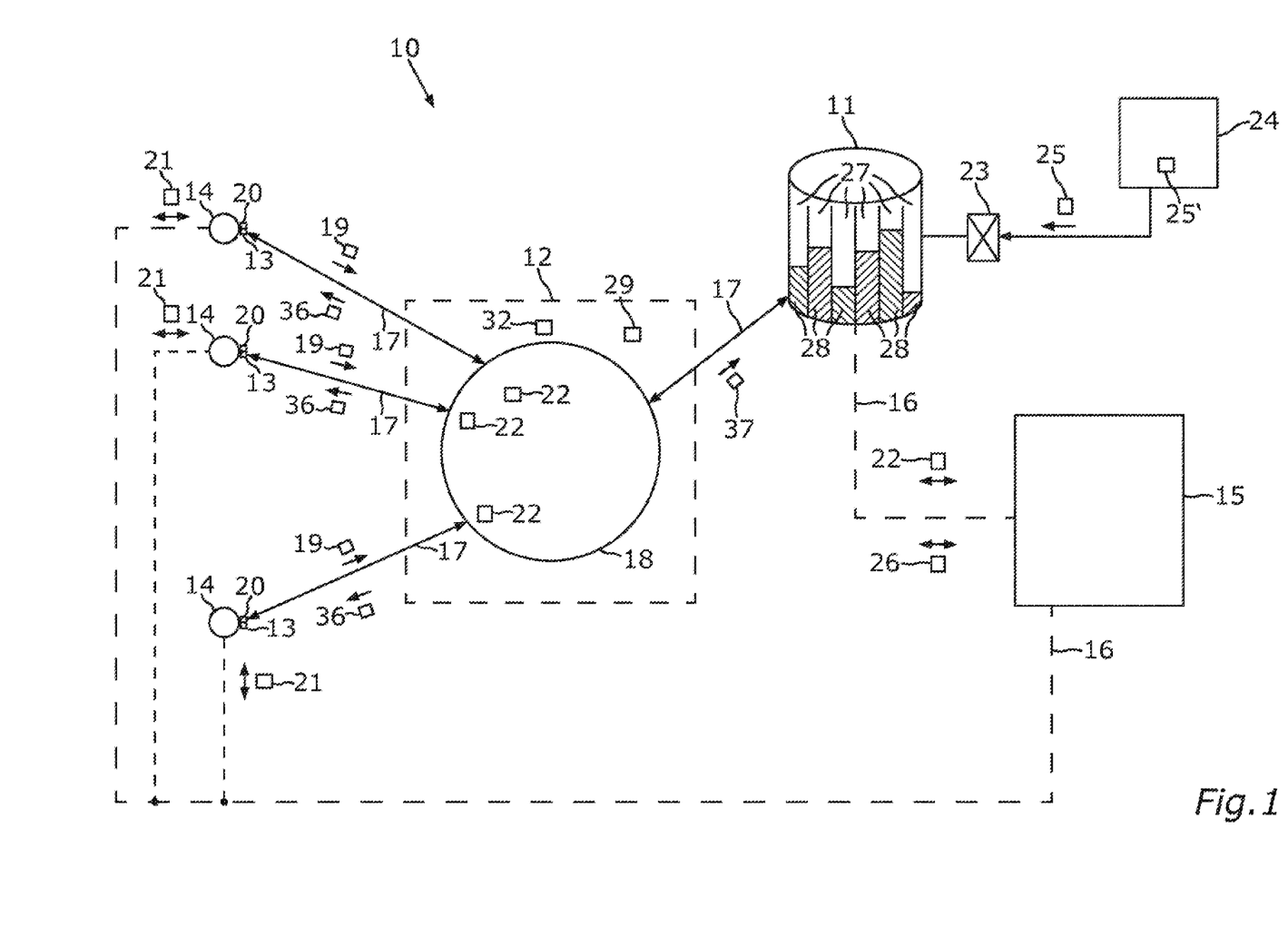
FIG. 1 is a schematic representation of an embodiment of the system according to the invention.

FIG. 1 shows a system 10 with an electrical central store 11, a control device 12 and a plurality of control units 13, each of which can be installed on a technical small unit 14. A technical small unit 14 can be, for example, a photovoltaic system or a heat pump or an electric vehicle. Each small unit 14 can be individually connected to an electrical power supply network or transmission grid 15. The central store 11 can also be connected to the transmission grid 15. Electrical transmission paths 16 for exchanging electrical power between the transmission grid 15 on the one hand, and the small units 14 or the central store 11 on the other hand, represent the physical connection between the said elements. The control device 12 can be coupled to the small units 14 and the central store 11 in each case via a communication connection 17. The communication connection 17 can be designed in each case as an internet connection, for example. The server device 12 can be, for example, a server on the internet. The control device 12 can provide or operate an energy data cloud 18 (in short: Energy Cloud), which may include, for example, a database. Via the communication connections 17, the control device 12 can receive relevant power data 19 from the small units 14 and aggregate them in the energy data cloud 18. The power data 19 can be collected or determined by means of a respective metering point 20 on each small unit 14. The data exchange of the power data 19 between the small units 14 and the control device 12 with the central store 11 can be optionally based on a blockchain technology. This enables, in particular, the authentication and/or verification and/or billing between the small units 14 and the control device 12.

The power data 19 can describe or indicate an electrical power 21 available in each small unit 14 that can be exchanged with the transmission grid 15. The power 21 can be absorbed as consumed power or output as generated power or can specify a buffered power. On the basis of the power data 19, the control device 20 can determine an individual schedule 22 for each small unit 14, which describes a profile of the available power 21 over time.

The central store 11 can be a technical unit, which can be equipped as a pre-qualified technical unit with a power capacity of more than 1 MW. The central store 11 can therefore supply control power 22 in the transmission grid 15. In other words, the central store 11 is approved for this purpose. Price conditions for the provision of the control power 22 can be specified by contract data 25', for example, the electricity exchange 24.

Via a data interface 23, the central store 11 can also receive a call-off plan 25 from an electricity exchange 24, which plan describes a power profile to be supplied in the transmission grid 15. The call-off plan 25 can designate, for example, a power block which defines a deployable power, e.g. 5 MW or 10 MW, for a predetermined period of time, e.g. 1 h or 2 h. The fulfillment of the call-off plan 25 is compensated in monetary terms.

The control device 12 can then fulfill the call-off plan 25 by way of the central store 11 alone or by the system 10 as a whole. To this end a part, in particular the majority, of the electrical power to be exchanged with the transmission grid 15 in accordance with the call-off plan 25 is supplied by the power 21 of the small units 14. The central store 11 then merely needs to supply a compensation power 26 to satisfy the call-off plan 25 in full.

The storage capacity of the central store 11 can also be divided into partitions 27, each of which is assigned a virtual charge status 28. If the central store 11 exchanges electrical energy as control power 22 or compensation power 26, then for each partition 27 it can be specified by the control device 12 in accordance with a distribution rule 29 how each charge status 28 changes in each case. For example, each partition 27 can be rented to a user and the charge status 28 can be changed whenever the user selects or requests the use of the partition 27 for supplying or consuming the energy. Thus, a user can hire virtual storage space. This means that the user itself does not need to provide its own technical small unit. Since the central store 11 can supply a primary control power of more than 1 MW, the user of the partition 27 can thus also participate in the energy market for supplying control power. To achieve this, the user does not itself need to provide a corresponding stationary battery store with this pre-qualification.

An operator of a small unit 14 can also use a partition 27 in the described way to buffer electrical energy, without having to provide a stationary battery store on the small unit 14 itself. To this end it can be provided that a partition 27 is assigned to a small unit 14, so that an exchange of power 21 by a small unit 14 can be recorded on the basis of the power data 19 and the charge status 28 of a partition 27 can be adjusted accordingly. In this case the central store 11 can then compensate for the electrical energy that is fed into the transmission grid 15 by the small unit 14 or extracted from it, by its own output or extraction of energy. With respect to the transmission grid 14, this results in a neutral energy balance.

Figure 2:
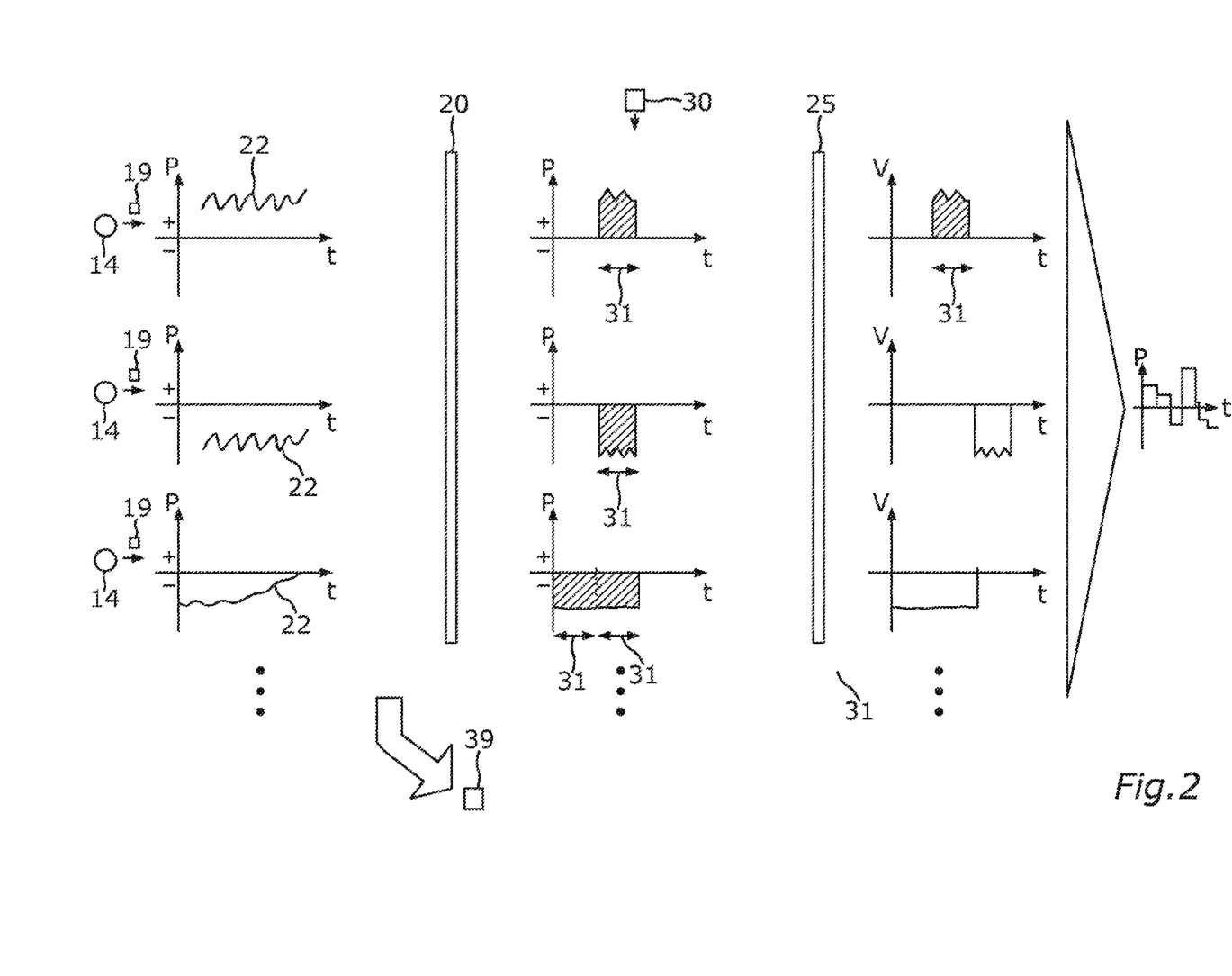
FIG. 2 is a diagram illustrating a data processing, which can be carried out in an energy data cloud of a control device of the system.

FIG. 2 illustrates how the control device 12 can enable electrical energy to be placed on the market on the basis of the small units 14 without the pre-qualification necessary to participate in the electricity exchange 24 being lost.

FIG. 2 also illustrates how the power data 19 from the small units 14 is received by the control device 12 and on the basis of the time series of the power values of the power data 19, how an individual schedule 22 can be determined that describes the available power 21 (P) over time t. The control device 12 cannot thus continuously select the small units 14 arbitrarily by means of the switching devices 13. For example, contract data can limit access to the small units 14 for the control device 12.

On the basis of the individual schedules 22 it is therefore decided what power 21 can be selected by the control device 12 by way of the switching units 13, hence its power exchange can be controlled. This process is based on access data 30, which allocate the individual schedules 22 such that usable time intervals 31, i.e. time intervals or time slices, can be defined within which the control device 12 has access to each respective small unit 14 to select it by way of the switching units 13. Now, however, not every time interval 31 is suitable for satisfying the call-off plan 25. The operation of a small unit 14 can incur costs which will need to be covered by revenue generated by fulfilling the call-off plan 25. In other words, a price for the supplied power 21 can be specified by the call-off plan 25. Thus, on the basis of the call-off plan 25, from the time intervals 31, those intervals for which a usable value or reference value V (V—value) indicates a profit or an efficient operation of the small unit 14 are selected.

On the basis of the call-off plan 25, the control device 12 can therefore form an optimization criterion 32, on the basis of which each time interval 31 of each small unit 14 can be evaluated. If the call-off plan 25 provides, for example, the provision or supply of electrical power for a time interval 31, then power consumed by a small unit 14 cannot provide a usable contribution. If the power to be supplied in accordance with the call-off plan 25 is limited in terms of the power value, for example 2 MW, then the control device 12 can specify by way of the optimization criterion 32 that the cheapest small units 14 are selected until the value of the power is reached.

Small units 14 will therefore be selected, which can each be operated efficiently for a specified time interval 31 in accordance with the call-off plan 25. Overall, this means that over the time t the available power P can be combined to form an overall call-off plan 33 available on the small units 14 as a whole.

On the basis of the individual schedules 22, the control device 12 can also extrapolate a forecast 39 of a future electrical behavior of the small units 14.

Figure 3:
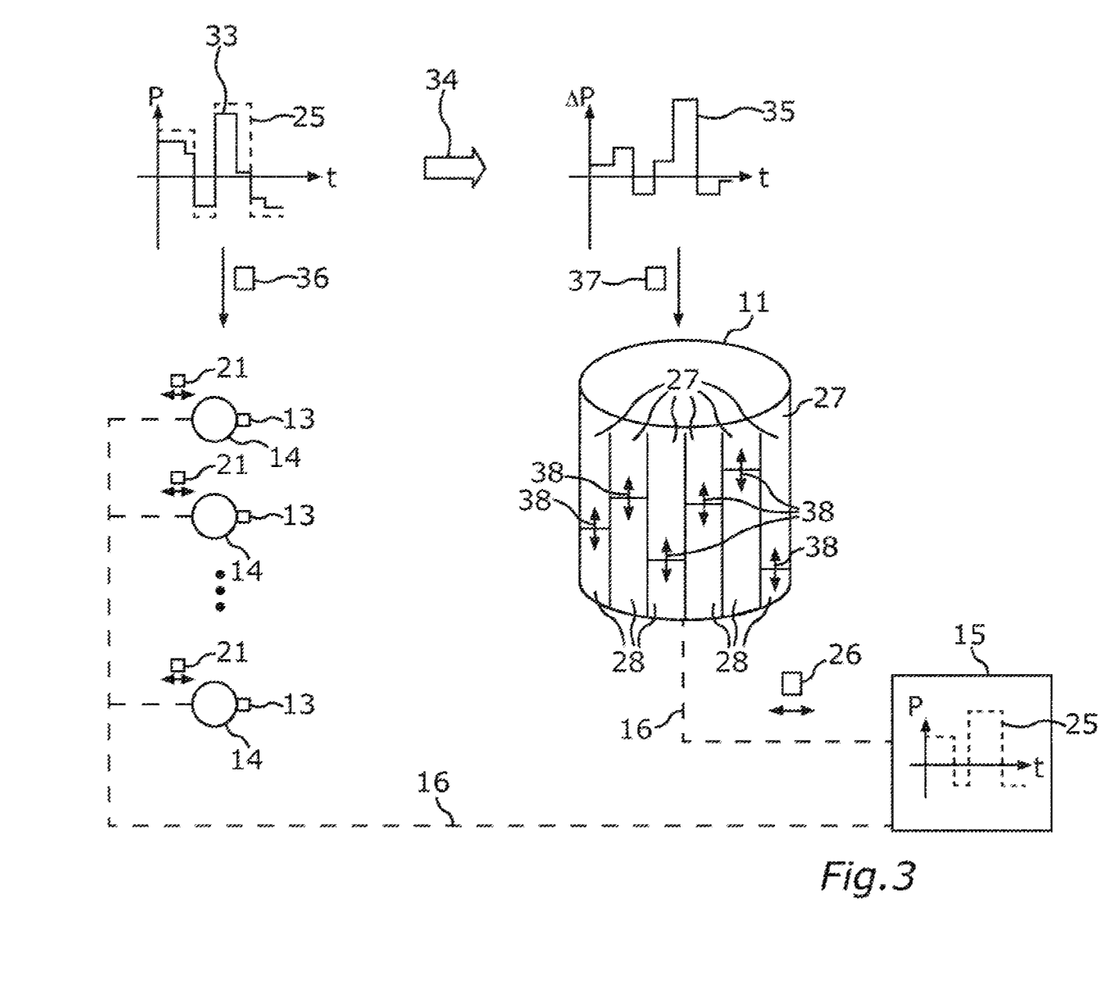
FIG. 3 is a diagram illustrating a control procedure for small units and a central store of the system of FIG. 1.

FIG. 3 illustrates the operation of the system 10 to fulfill the call-off plan 25. From the call-off plan 25 and the overall schedule 33 of the small units 14, the control device 12 can determine, by a balancing 34 or difference calculation, a missing proportion ΔP of the power required in accordance with the call-off plan 25, resulting in a delta schedule 35.

In accordance with the overall schedule 33, control signals 13 can then be issued to the switching devices 36 of the small units. By means of the delta schedule 35, a control signal 37 can be generated for the central store 11 so that the latter supplies the corresponding compensation power 26. The power 21 supplied by the small units 14 and the compensation power 26 in total yield the call-off plan 25 in the transmission grid 15. Thus, by means of the central store 11 it is guaranteed or ensured that the system 10 fulfils the call-off plan 25. In addition, by means of the central store 11 the pre-qualification required to participate in the electricity exchange 24 can be demonstrated.

The energy which is output by the central store 10 to provide the compensation power 26 or absorbed thereby can then also lead to a change 38 in the charge statuses 28 of the partitions 27. If a small unit 14 is assigned to a partition 27, then it is not only the power 21 that the small unit 14 instantaneously or currently provides which is used during the implementation of the call-off plan 25. Instead, electrical energy can be additionally transferred from the small unit 14 into a partition 27 before the fulfillment of the call-off plan 25 and then additionally used.

LIST OF REFERENCE NUMERALS 10 system
11 electrical central store
12 control device
13 switching unit
14 technical small unit
15 electrical transmission grid
16 transmission path
17 communication connection
18 energy data cloud
19 power data
20 metering point
21 power
22 control power
23 data interface
24 electricity exchange
25 call-off plan
25' contract data
26 compensation power
27 partition
28 charge status
29 distribution rule
30 access data
31 time interval
32 optimization criterion
33 overall schedule
34 balancing
35 delta schedule
36 control signal
37 control signal
38 change of charge status
39 forecast
P power
ΔP power difference
V reference value
t time The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A method for coordinating an exchange of power between a plurality of technical small units and a transmission grid, the method comprising:
    operating an energy data cloud via a central control device, in which the control device aggregates power data of the small units and on the basis thereof, for each small unit, the control device in each case:
        records an individual schedule for an available electrical power on the small unit,
        determines at least one time interval, within which the exchange of power is allowed to be initiated on the small unit by the central control device in accordance with predetermined access data,
        on the basis of a predetermined call-off plan of a network operator of the transmission grid or an electricity exchange, determines a reference value of the available power in the respective time interval in accordance with the individual schedule, and,
        if the reference value satisfies a predetermined optimization criterion, selects the small unit for an exchange of power with the transmission grid in the respective time interval, wherein
    for each identified time interval, from the individual schedules of all small units selected for the respective time interval, the central control device forms an overall schedule and selects the power exchange of the small units with the transmission grid in accordance with the overall schedule, and
    by way of the control device, from a balancing of the overall schedule and the call-off plan of the network operator or electricity exchange, a delta schedule is calculated and a central store connected to the transmission grid is activated in accordance with the delta schedule, so that the central store exchanges an electrical compensation power with the transmission grid, so that the technical small units and the central store together fulfill the call-off plan.

2. The method according to claim 1, wherein
    the optimization criterion provides a threshold value comparison with a predefined threshold value and/or an overall value optimization of the total power exchanged between the central store and the small units, and the transmission grid.

3. The method according to claim 1, wherein the control device additionally controls the central store so that the latter supplies electrical control power with the transmission grid in accordance with predetermined contract data, so that an additional power flow of control power is obtained.

4. The method according to claim 3, wherein at least a part of a total control energy exchanged by the power flow overall:
   a) in the case of a control power output: is accumulated in the central store by way of the small units before deployment of the control power, and/or
   b) in the case of control power uptake: is consumed in the small units after the deployment of the control power.

5. The method according to claim 4, wherein for each small unit a respective portion is determined, which the small unit has due to its respective energy contribution to the total control energy, and on the basis of the contract data a revenue value of the portion is calculated and credited to the small unit.

6. The method according to claim 1, wherein to accumulate energy before the deployment of the control power, the central store draws electrical power via the transmission grid from a different source than the small units, if a price signal indicates that the source is cheaper than the small units.

7. The method according to claim 1, wherein
   at least a part of the central store is sub-divided into virtual partitions, each of which represents a part of a storage capacity of the central store, and for each partition a separate charge status of electrical energy is specified in accordance with a predetermined distribution rule, and
   in the event of a change in the charge status, an equivalent value of the resulting electrical energy exchanged with the transmission grid is charged to a billing account associated with the respective partition.

8. The method according to claim 1, wherein the power required by the call-off plan is greater than any power that is suppliable by each individual small unit.

9. The method according to claim 1, wherein in the transmission grid the supply of power in accordance with the call-off plan is only permitted for technical units which have a pre-qualification greater than a predefined power value, and each technical small unit has a nominal power less than the power value.

10. The method according to claim 1, wherein each small unit is a technical unit with a nominal power of less than 1 MW.

11. The method according to claim 1, wherein each small unit is a technical unit with a nominal power of less than 100 kW.

12. The method according to claim 1, wherein the small units comprise one or more of the following: a photovoltaic system, a pumped-storage power plant, a heat pump, an electrically operable motor vehicle with external charging interface, and a stationary battery accumulator.

13. The method according to claim 1, wherein the central store stores electrical energy by way of electrochemical rechargeable batteries and/or by way of a pumped-storage power plant, the central store having a pre-qualification of at least 1 MW.

14. The method according to claim 1, wherein on the basis of the individual schedules, a forecast of future electrical behavior is extrapolated.

15. A control device configured to control a central store and a plurality of switching units for respectively selecting a respective technical small unit, wherein
   the control device comprises a microprocessor and is operatively configured to carry out the acts of:
   operating an energy data cloud, in which the control device aggregates power data of the small units and on the basis thereof, for each small unit, the control device in each case:
      records an individual schedule for an available electrical power on the small unit,
      determines at least one time interval, within which the exchange of power is allowed to be initiated on the small unit by the central control device in accordance with predetermined access data,
      on the basis of a predetermined call-off plan of a network operator of the transmission grid or an electricity exchange, determines a reference value of the available power in the respective time interval in accordance with the individual schedule, and,
      if the reference value satisfies a predetermined optimization criterion, selects the small unit for an exchange of power with the transmission grid in the respective time interval,
   wherein
   for each identified time interval, from the individual schedules of all small units selected for the respective time interval, the central control device forms an overall schedule and selects the power exchange of the small units with the transmission grid in accordance with the overall schedule, and
   by way of the control device, from a balancing of the overall schedule and the call-off plan of the network operator or electricity exchange, a delta schedule is calculated and a central store connected to the transmission grid is activated in accordance with the delta schedule, so that the central store exchanges an electrical compensation power with the transmission grid, so that the technical small units and the central store together fulfill the call-off plan.

16. A system, comprising:
   a central store;
   a plurality of switching units for respectively selecting a respective small technical unit; and
   a control device configured to control the central store and the plurality of switching units for respectively selecting a small technical unit, wherein
   the control device comprises a microprocessor and is operatively configured to carry out the acts of:
   operating an energy data cloud via a central control device, in which the control device aggregates power data of the small units and on the basis thereof, for each small unit, the control device in each case:
      records an individual schedule for an available electrical power on the small unit,
      determines at least one time interval, within which the exchange of power is allowed to be initiated on the small unit by the central control device in accordance with predetermined access data,
      on the basis of a predetermined call-off plan of a network operator of the transmission grid or an electricity exchange, determines a reference value of the available power in the respective time interval in accordance with the individual schedule, and, if the reference value satisfies a predetermined optimization criterion, selects the small unit for an exchange of power with the transmission grid in the respective time interval, wherein for each identified time interval, from the individual schedules of all small units selected for the respective time interval, the central control device forms an overall schedule and selects the power exchange of the small units with the transmission grid in accordance with the overall schedule, and by way of the control device, from a balancing of the overall schedule and the call-off plan of the network operator or electricity exchange, a delta schedule is calculated and a central store connected to the transmission grid is activated in accordance with the delta schedule, so that the central store exchanges an electrical compensation power with the transmission grid, so that the technical small units and the central store together fulfill the call-off plan.

* * * * *